(12) United States Patent
Bathiche et al.

(10) Patent No.: US 9,395,902 B2
(45) Date of Patent: Jul. 19, 2016

(54) SYSTEMS AND METHODS FOR PARALLAX COMPENSATION

(71) Applicant: Elwha, LLC, Bellevue, WA (US)

(72) Inventors: Steven Bathiche, Kirkland, WA (US); Jesse R. Cheatham, III, Seattle, WA (US); Paul H. Dietz, Redmond, WA (US); Matthew G. Dyor, Bellevue, WA (US); Philip A. Eckhoff, Bellevue, WA (US); Anoop Gupta, Jr., Woodinville, WA (US); Kenneth P. Hinckley, III, Redmond, WA (US); Roderick A Hyde, Redmond, WA (US); Muriel Y. Ishikawa, Livermore, CA (US); Jordin T. Kare, Seattle, WA (US); Craig J. Mundie, Seattle, WA (US); Nathan P. Myhrvold, Bellevue, WA (US); Andreas G. Nowatzyk, San Jose, CA (US); Robert C. Petroski, Seattle, WA (US); Danny Allen Reed, Iowa City, IA (US); Clarence T. Tegreene, Mercer Island, WA (US); Charles Whitmer, North Bend, WA (US); Victoria Y. H. Wood, Livermore, CA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 480 days.

(21) Appl. No.: 13/837,844

(22) Filed: Mar. 15, 2013

(65) Prior Publication Data

US 2014/0267178 A1  Sep. 18, 2014

(51) Int. Cl.
*G06F 3/041* (2006.01)
*G06F 3/0488* (2013.01)
*G06F 3/01* (2006.01)

(52) U.S. Cl.
CPC .............. *G06F 3/0488* (2013.01); *G06F 3/013* (2013.01); *G06F 3/0418* (2013.01)

(58) Field of Classification Search
CPC ............. G06F 3/00; G06F 3/01; G06F 3/033; G06F 3/041; G06F 3/042; G06F 3/044; G06F 3/0485; G06F 3/0488; G06F 3/0418; G09G 1/00; G09G 1/28; G09G 5/00; G09G 5/38; G09G 3/02; G06K 19/06; G06K 7/12; G06K 7/14; G06K 9/00; G06K 9/40; G08C 21/00; G06T 15/00
See application file for complete search history.

(56) References Cited

U.S. PATENT DOCUMENTS

| 4,947,156 A | 8/1990 | Sato et al. |
| 5,565,894 A | 10/1996 | Bates et al. |

(Continued)

*Primary Examiner* — Ilana Spar
*Assistant Examiner* — Nguyen H Truong

(57) ABSTRACT

An electronic device may include a touch screen electronic display configured to offset and/or shift the contact locations of touch implements and/or displayed content based on one or more calculated parallax values. The parallax values may be associated with the viewing angle of an operator relative to the display of the electronic device. In various embodiments, the parallax value(s) may be calculated using three-dimensional location sensors, an angle of inclination of a touch implement, and/or one or more displayed calibration objects. Parallax values may be utilized to remap contact locations by a touch implement, shift and/or offset displayed content, and/ or perform other transformations as described herein. A stereoscopically displayed content may be offset such that a default display plane is coplanar with a touch surface rather than a display surface. Contacts by a finger may be remapped using portions of the contact region and/or a centroid of the contact region.

16 Claims, 13 Drawing Sheets

(56) References Cited

U.S. PATENT DOCUMENTS

| | | |
|---|---|---|
| 5,621,438 A | 4/1997 | Kamimura et al. |
| 6,809,726 B2 | 10/2004 | Kavanagh |
| 7,657,095 B2 | 2/2010 | Tonouchi |
| 8,004,503 B2 | 8/2011 | Zotov et al. |
| 8,884,928 B1 | 11/2014 | Baldwin |
| 2002/0070926 A1 | 6/2002 | Kavanagh |
| 2006/0007182 A1 | 1/2006 | Sato et al. |
| 2006/0279552 A1 | 12/2006 | Tonouchi |
| 2008/0100586 A1 | 5/2008 | Smart |
| 2008/0106520 A1* | 5/2008 | Free et al. .................... 345/173 |
| 2010/0007940 A1 | 1/2010 | Tsuboi |
| 2010/0079405 A1* | 4/2010 | Bernstein .................... 345/174 |
| 2010/0142127 A1* | 6/2010 | Johansson ................ 361/679.01 |
| 2011/0093778 A1 | 4/2011 | Kim et al. |
| 2011/0163968 A1* | 7/2011 | Hogan ........................ 345/173 |
| 2011/0163988 A1 | 7/2011 | Senda |
| 2011/0267280 A1 | 11/2011 | DeMers |
| 2012/0032896 A1 | 2/2012 | Vesely |
| 2012/0036433 A1* | 2/2012 | Zimmer et al. .............. 715/702 |
| 2012/0304284 A1 | 11/2012 | Johnson et al. |
| 2013/0002560 A1* | 1/2013 | Chen et al. .................... 345/168 |
| 2014/0098085 A1 | 4/2014 | Lee et al. |
| 2014/0118291 A1* | 5/2014 | Fujii .......................... 345/174 |
| 2014/0145966 A1* | 5/2014 | Gardenfors .................... 345/173 |
| 2014/0149947 A1 | 5/2014 | Blyumen |

* cited by examiner

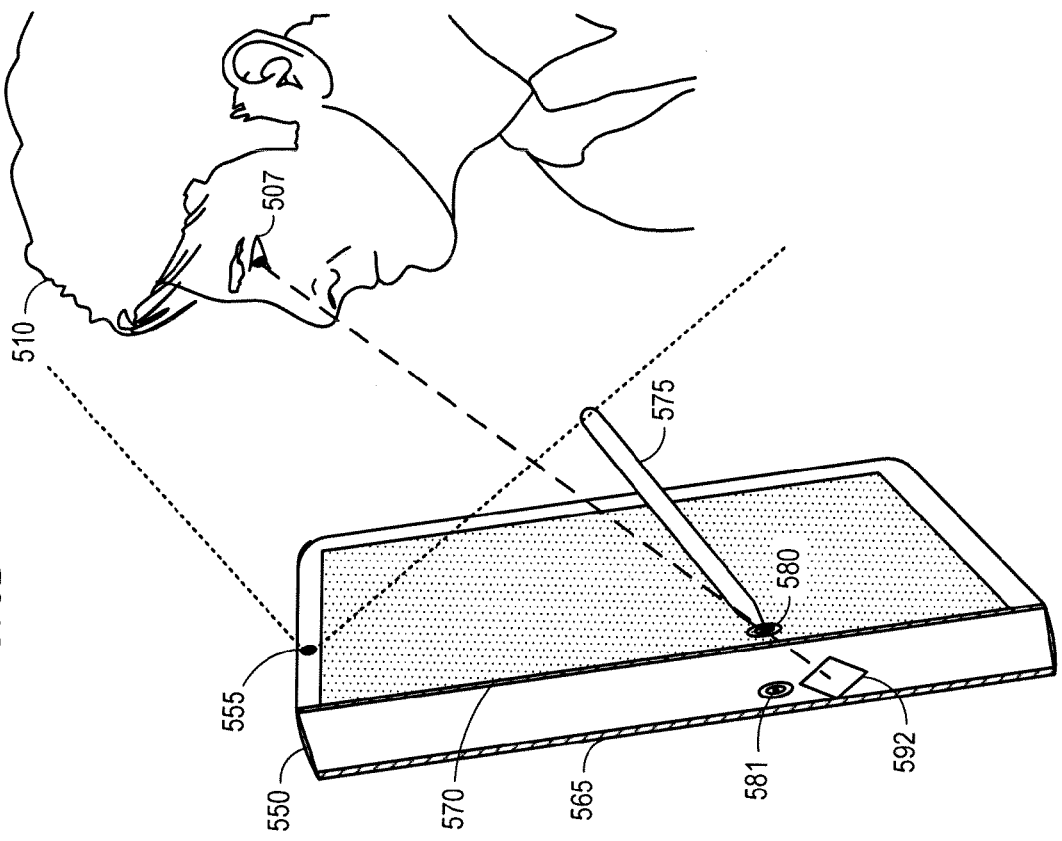
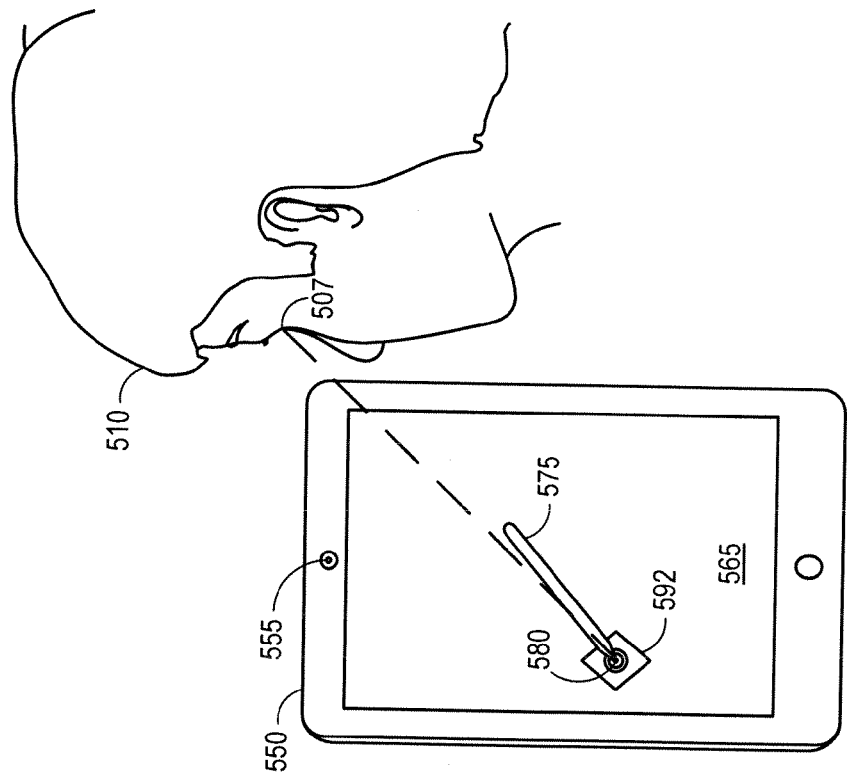
FIG. 5B
FIG. 5A

SYSTEMS AND METHODS FOR PARALLAX COMPENSATION

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

NONE

Related Applications:

U.S. patent application Ser. No. 13/837,754, entitled SYSTEMS AND METHODS FOR PARALLAX COMPENSATION, naming Steven Bathiche, Jesse R. Cheatham, Paul H. Dietz, Matthew G. Dyor, Philip A. Eckhoff, Anoop Gupta, Kenneth P. Hinckley, Roderick A. Hyde, Muriel Y. Ishikawa, Jordin T. Kare, Craig J. Mundie, Nathan P. Myhrvold, Andreas G. Nowatzyk, Robert C. Petroski, Danny A. Reed, Clarence T. Tegreene, Charles Whitmer, Victoria Y.H. Wood, and Lowell L. Wood, Jr. as inventors, filed Mar. 15, 2013,is related to the present application.

U.S. patent application Ser. No. 13/837,800, entitled SYSTEMS AND METHODS FOR PARALLAX COMPENSATION, naming Steven Bathiche, Jesse R. Cheatham, Paul H. Dietz, Matthew G. Dyor, Philip A. Eckhoff, Anoop Gupta, Kenneth P. Hinckley, Roderick A. Hyde, Muriel Y. Ishikawa, Jordin T. Kare, Craig J. Mundie, Nathan P. Myhrvold, Andreas G. Nowatzyk, Robert C. Petroski, Danny A. Reed, Clarence T. Tegreene, Charles Whitmer, Victoria Y.H. Wood, and Lowell L. Wood, Jr. as inventors, filed Mar. 15, 2013, is related to the present application.

U.S. patent application Ser. No. 13/895,229, entitled SYSTEMS AND METHODS FOR PARALLAX COMPENSATION, naming Steven Bathiche, Jesse R. Cheatham, Paul H. Dietz, Matthew G. Dyor, Philip A. Eckhoff, Anoop Gupta, Kenneth P. Hinckley, Roderick A. Hyde, Muriel Y. Ishikawa, Jordin T. Kare, Craig J. Mundie, Nathan P. Myhrvold, Andreas G. Nowatzyk, Robert C. Petroski, Danny A. Reed, Clarence T. Tegreene, Charles Whitmer, Victoria Y.H. Wood, and Lowell L. Wood, Jr. as inventors, filed May 15, 2013, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

This disclosure relates to parallax compensation for touch screen displays. Specifically, this disclosure relates to corrections, adjustments, and transformations of touch contacts and/or displayed objects on a touch screen device.

SUMMARY

Touch screen electronic devices may be viewed at multiple viewing angles. A touch screen electronic device may include an electronic display, such as a liquid crystal display (LCD), light-emitting diode (LED) display, organic LED (OLED) displays, and/or other display types. A touch screen digitizer may be aligned with the electronic display and configured to receive touch inputs via a touch implement, such as a stylus or finger. The electronic display and the touch screen digitizer may be integrated as a single component or as separate components of the electronic devices. The touch screen digitizer may include a touch surface, such as glass or acrylic, configured to receive the direct contacts from the touch implement. The distance between the touch surface and the surface of the electronic display may vary depending on the type of electronic device, the size of the components, the method of construction, the thickness of the touch surface, and/or other design and construction factors.

Locations on the touch surface of the touch screen digitizer may be perpendicularly aligned with locations on the electronic display. A contact on the touch surface may be mapped perpendicularly to a corresponding location on the surface of the electronic display. For example, if an operator of the electronic device desires to select an object displayed on the electronic display, the operator may touch (via a finger, stylus, or other touch implement) a location perpendicular to the displayed object on the touch surface of the touch screen digitizer.

As will be appreciated by one of skill in the art, a parallax effect may be introduced depending on the viewing angle of the operator relative to the touch surface of the touch screen digitizer and the electronic display. A parallax value associated with an operator's viewing angle relative to the touch surface and electronic display may correspond to the difference between the location on the touch surface perpendicular to a displayed object and the perceived location on the touch surface corresponding to the displayed object. The perceived location on the touch surface may be along the line of sight extending from one or both eyes of the operator to the displayed object.

In some embodiments, the parallax value may be calculated based on location information of a head and/or eyes of the operator relative to the electronic display. A three-dimensional location sensor may be used to determine the location information of the head and/or eyes of the operator. The calculated parallax value may be used to map a detected contact on the touch surface to an intended contact location on the electronic display and/or a location on the touch surface perpendicular to the intended contact location on the electronic display.

The parallax value may alternatively or additionally be used to shift displayed content based on the parallax value. For example, an object may be displayed at a perceived contact location as opposed to the location on the electronic display perpendicular to the actual contact by a touch implement on the touch surface. Similarly, displayed content may be dragged, shifted, moved, and/or otherwise manipulated on the electronic display from one or more perceived contact locations to other perceived contact locations based on the calculated parallax value and the detected contact(s) by the touch implement with the touch surface.

In some embodiments, displayed content may be shifted on the electronic display as the head and/or the eyes of the operator move relative to the electronic display. For example, a contact by a touch implement with the touch surface may correspond to a displayed object. The displayed object may, according to any of the embodiments described herein, be shifted and/or offset by a calculated parallax value such that the contact point of the touch implement with the touch surface is perceived by the operator as contacting the displayed object. As the head and/or eyes of the operator are moved relative to the electronic device (whether due to movement of the operator and/or movement of the electronic device) the displayed object may be shifted and/or offset to maintain the perception that the contact point of the touch implement contacts the displayed object.

As described herein, in some embodiments, the parallax value may be calculated using a three-dimensional location sensor to determine three-dimensional location information associated with the head and/or eyes of the operator. In other embodiments, the electronic device may include a calibration mode configured to calculate one or more parallax values. The calibration mode may be seamlessly integrated within the normal operator of the electronic device so as to be unobtrusive or may be an explicitly selected mode. By requesting (explicitly or implicitly) the operator to select one or more buttons, icons, or other displayed objects, the electronic device may compare an actual contact location of the touch implement with the touch surface to the location on the touch surface perpendicular to the displayed button, icon, or other displayed object. The difference between the location on the touch surface perpendicular to the displayed button, icon, or other displayed object and the actual/detected contact location of the touch implement with the touch surface may be used to determine a parallax value.

In some embodiments, a parallax value may be calculated using location information determined by a three-dimensional location sensor and/or via displayed calibration content for one or more potential contact locations on the touch surface of the electronic device. In some embodiments, a parallax value may be calculated for every potential contact location on the touch surface of the electronic device. In other embodiments, one or more calculated parallax values for one or more contact locations may be used to derive parallax values for one or more other potential contact locations.

In one embodiment, a stereoscopic display may be utilized to offset the default depth of the three-dimensional display to be coplanar with the touch surface. According to such an embodiment, two-dimensional content may be stereoscopically displayed to "pop" out in a default position such that the displayed content is perceived as being displayed coplanar with the surface of the touch surface, such that a contact on the touch surface by a touch implement is perceived as directly contacting the displayed content perpendicular to the detected contact location of the touch implement on the touch surface. In a three-dimensional display, the default or rest depth of the displayed content may be offset so as to be coplanar with the touch surface. Any of the embodiments described herein may additionally be employed to offset, shift, or select displayed content that is displayed as popped out or pushed in relative to the default or rest depth of the three-dimensionally displayed content. For example, content that is displayed as pushed in may be selected by a contact by a touch implement on the touch surface along the line of sight of the operator to the displayed content using any of the embodiments described herein, such as three-dimensional head location information or calibration results. Content that is displayed as coplanar to the touch surface may be selected by a perceived direct contact with the displayed object at the touch surface.

Alternatively or additionally, one or more parallax values may be calculated and/or derived based on location information of the operator and an angle of inclination of the stylus relative to the electronic display. As may be appreciated by one of skill in the art, the size, shape, and/or angle of inclination of a touch implement, such as a finger or stylus, may affect the line of sight drawn between the eyes of the operator, the contact point (or perceived contact point) of the finger or stylus, and the intended object or location on the electronic display. Accordingly, the parallax value associated with displayed content and/or contact locations may be determined, at least partially, based on the angle of inclination of the touch implement relative to the electronic display.

Additionally, the contact region of a finger contact with the touch surface may be offset, shifted, and/or used to offset and/or shift displayed content based on a mapping of the contact region of the finger contact with the touch surface. Variations of the above embodiments, including various combinations thereof, are contemplated and selectively described in greater detail below. Various benefits, advantages, solutions to problems, embodiments, and potential combinations of embodiments are described herein. However, the scope of the present invention is not limited to the explicitly described examples and embodiments and should, instead, be determined by the claims provided herein.

BRIEF DESCRIPTION OF THE DRAWINGS

FIG. 5A illustrates a line of sight of an operator contacting a touch surface with a touch implement intending to contact a displayed object.

FIG. 5B illustrates a side view of the line of sight of the operator contacting the touch surface with the touch implement.

DETAILED DESCRIPTION

Figure 1:
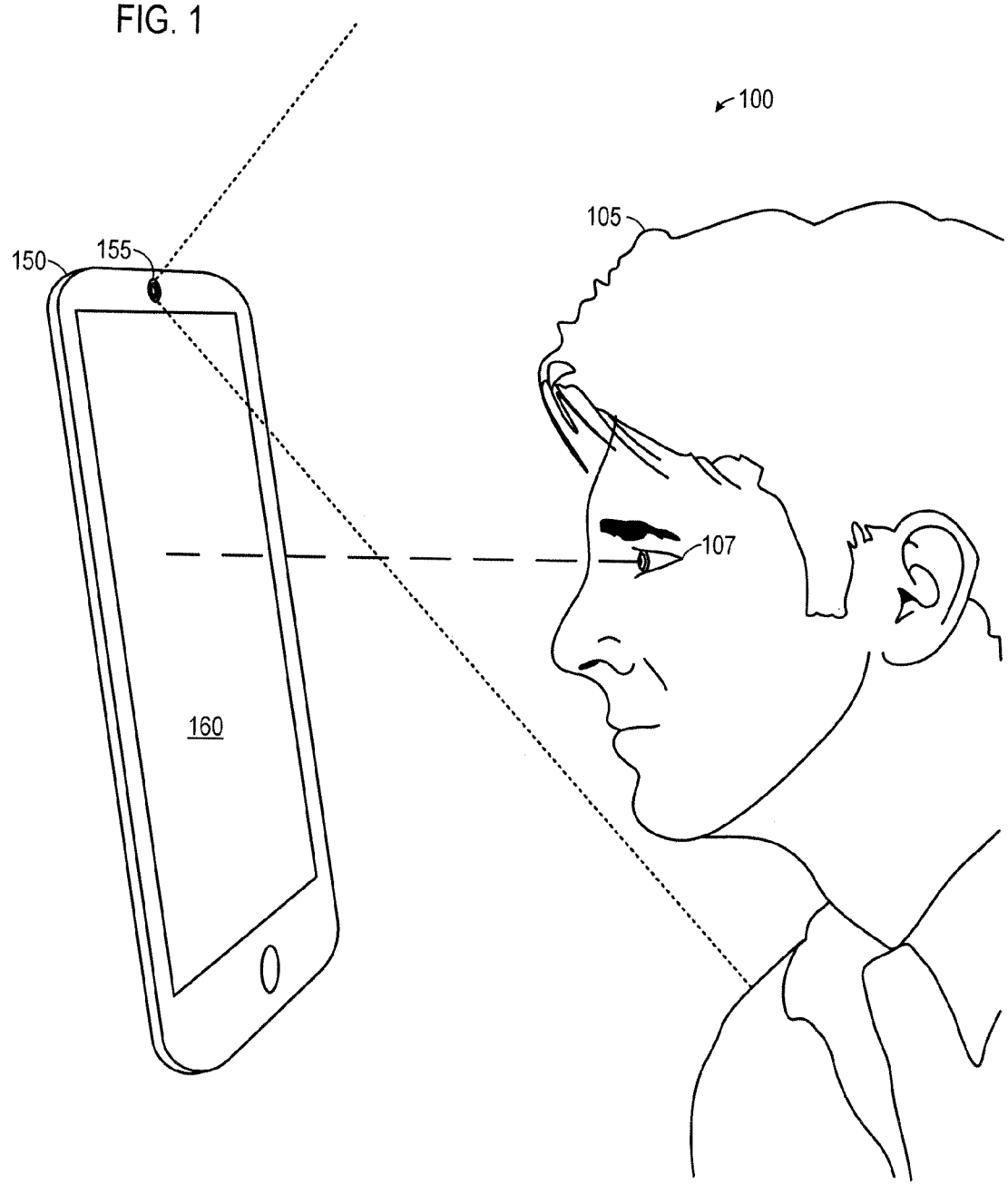
FIG. 1 illustrates a three-dimensional location sensor of an electronic device used to calculate a parallax value associated with the viewing angle of the operator.

Using a default mapping, locations on the touch surface of a touch screen digitizer may be perpendicularly mapped to correspond to locations on an electronic display of an electronic device. Accordingly, a contact on the touch surface may be mapped perpendicularly to a displayed object or contact location on the electronic display. Thus, if an operator of the electronic device desires to select an object displayed on the electronic display, the operator may touch (via a finger, stylus, or other touch implement) a location perpendicular to the displayed object on the touch surface of the touch screen digitizer.

If an operator is not perpendicularly aligned with the intended contact location or displayed object, a parallax effect associated with an operator's viewing angle may result in errors, such as accidental selections and/or erroneous contact locations. According to various embodiments described herein, a parallax value may be calculated and used to offset or shift contact locations and/or to offset or shift displayed content. The parallax value may correspond to the difference between the location on the touch surface perpendicular to a displayed object and the perceived location on the touch surface corresponding to the displayed object. The perceived location on the touch surface may be along the line of sight extending from one or both eyes of the operator to the displayed object or intended contact location.

In various embodiments, the parallax value may be calculated using location information of a head and/or eyes of the operator relative to the electronic display. For example, knowledge of an angle, $\theta$, between a normal vector of a display and a line-of-sight vector from a location on the display to the head/eyes of an operator and the perpendicular separation, $h$, between the touch screen's surface and that of the aligned electronic display can be used to calculate a parallax value. The normal vector of the display may be defined as the direction perpendicular to the touch screen's surface, which in many instances, may be approximately equivalent to that of the aligned electronic display. The parallax value, for example, may be expressed as a distance offset, $d$, and be calculated by: $d = h \tan \theta$.

The direction of the parallax relative to the axes of the electronic display may be defined with respect to an azimuth angle $\phi$ of the line-of-sight vector relative to the axes of the electronic display. For instance, unit vector x can denote a horizontal axis within the plane of the display surface, unit vector y can denote a vertical axis within the plane of the display surface. A unit vector z may then denote the normal unit vector perpendicular to the display surface. A line-of-sight unit vector from a location on the display to the head of an operator can be denoted as v, which may be expressed in terms of $\theta$ and $\phi$ by: $v = x \sin \theta \cos \phi + y \sin \theta \sin \phi + z \cos \theta$.

The angle $\theta$ may be determined via $\cos \theta = v \cdot z$. As described above, the absolute distance offset, $d$, can be determined via $d = h \tan \theta$. The distance offset may lie along horizontal direction x, vertical direction y, or a combination thereof. In many instances, the distance offset may include both horizontal and vertical components. The horizontal component of the distance offset may be defined as $d_x = d \cos \phi$, and the vertical component of the distance offset can be defined as $d_y = d \sin \phi$. The components $d_x$ and $d_y$ may both be multiplied by a positive or a minus sign depending upon convention used to define the polarity of the distance offset. Alternatively, the components $d_x$ and $d_y$ may be defined in terms of quadrants with respect to a location on the electronic display or the touch surface intersecting the line-of-sight vectors.

The line-of-sight unit vector v can be determined from knowledge of the location of the head of the operator R in three-dimensional space and that of a location on the surface of the display r by first determining their three-dimensional vector separation, $V_s = R - r$, and then normalizing this into the product of a range R and the line-of-sight unit vector v by $R = |V_s|$ and $v = V_s/R$. Then v can be used to determine $d$, $d_x$, and $d_y$, by solving for the angles $\theta$ and $\phi$, and/or by using the vector equations.

Calculating the parallax from operator locational information may be performed using knowledge of the line-of-sight unit vector v. In some embodiments, v can be determined using a two-dimensional sensor. For instance, a camera mounted on the display could measure a camera vector $v_c$ from the location of the camera to the head of an operator. However, if the camera location $r_c$ does not coincide with the site on the display r for which the parallax is desired, its unit line-of-sight vector of the camera $v_c$ may be slightly different from the unit line-of-sight vector v from r. In some embodiments, the camera vector $v_c$ may be used as a sufficiently accurate approximation. In other embodiments, the camera vector $v_c$ may be used to calculate the unit line-of-sight vector v from r.

For a given location of the operator's head R different sites on the display surface $r_k$ will each have a unique parallax value corresponding to their separation $V_k = R - r_k$ from the operator. The line-of-sight vector from a first location $v_1$ (and hence parallax) from a first location $r_1$ may not be the same as the line-of-sight vector from a second location $v_2$ from a second location $r_2$ or the same as the line-of-sight vector from the camera $v_c$ from the camera location $r_c$. Thus, in many embodiments, it may be useful measure the three-dimensional location of the head of operator R so as to allow accurate parallaxes to be calculated for desired locations $r_k$ on the display. For example, a three-dimensional location sensor, such as one or more cameras and/or range finders, may be used to determine the location information of the head and/or eyes of the operator.

A known alignment relationship between the touch screen and the electronic display and knowledge of the location of the head of the operator relative to the touch screen permits knowledge of the location of the head (eyes) of the operator relative to that of the electronic display, and vice versa. Accordingly, these pieces of information may be treated as functionally equivalent.

In some embodiments, the display surface is not planar, i.e., z and/or x and y, may vary with position r on the display. The parallax values for each position r may be calculated using the above relations and by having x, y, z vary as specified functions of location r. The calculated parallax value may be used to map a detected contact on the touch surface to an intended contact location on the electronic display and/or a location on the touch surface perpendicular to the intended contact location on the electronic display.

A detected contact location by the touch implement with the touch surface may be mapped to a perceived contact location using the parallax value. At least a portion of displayed content on the electronic display may be offset and/or shifted based on the calculated parallax value. Multiple contact locations may be used to determine multiple perceived contact locations that may be used to shift a portion of the displayed content from a location corresponding to the first perceived contact location to a second perceived contact location.

Perceived contact locations of a single contact by a touch implement at a contact location on a touch surface at different times due to movement of the electronic display and/or the operator may be used to shift displayed content between the various perceived contact locations. For example, as an operator moves, the displayed content may be shifted on the display to maintain the displayed content in the line of sight intersecting the contact location of the touch implement on the touch surface. Multiple perceived contact locations associated with multiple contacts by a touch implement at various contact locations on the touch surface may be used to perform operations, such as swipes, pinch zooms, scrolling, zooming, etc. In each of the above embodiments, one or more calculated and/or derived parallax values may be used to determine the perceived contact locations.

Calculated parallax values may be used to derive a parallax value for each of a plurality of potential contact locations of the touch implement with the touch surface. Subsequently displayed objects on the electronic display may be offset based on the calculated and/or derived parallax values.

In some embodiments, an electronic device may include an electronic display configured to display content at selectable depths using stereopsis (associated with stereoscopically displayed content). A touch screen digitizer having a touch surface may be aligned with the electronic display. The digitizer may be configured to detect contacts by a touch implement with the touch surface. A parallax alignment module may be configured to adjust the default depth of the displayed content to be perceived as co-planar with the touch surface. The parallax alignment module may utilize one or more calculated and/or derived parallax values for one or more locations on the touch surface. The parallax values may be calculated and/or derived using any of the various embodiments described herein.

As described herein, one or more parallax values may be calculated using the displayed calibration content for one or more potential contact locations on the touch surface of the electronic device. In some embodiments, a parallax value may be calculated for every potential contact location on the touch surface of the electronic device. In other embodiments, one or more calculated parallax values for one or more contact locations may be used to derive parallax values for one or more other potential contact locations.

For example, parallax values may be determined for locations at the left and right borders of a display surface, and then the parallax at points in between can be derived by interpolation from these two values. Similarly, parallax values near the corners or borders of the display can be interpolated to derive parallax values at interior points. Similarly, parallax values at interior locations can be extrapolated to outer locations, or can be interpolated to locations within regions between sets of such locations (e.g., triangular regions defined by 3 interior or border locations having known parallax values).

In some embodiments, one or more parallax values may be calculated and/or derived based on location information of the operator and an angle of inclination of the stylus relative to the electronic display and/or line of sight of an operator. Additionally, the contact region of a finger contact with the touch surface may be offset, shifted, and/or used to offset and/or shift displayed content based on a mapping of the contact region of the finger contact with the touch surface.

Some of the infrastructure that can be used with embodiments disclosed herein is already available, such as touch screens, digital and analog displays, digitizers, three-dimensional location sensors, cameras, range sensors, accelerometers, gyroscopic devices, general-purpose computers, computer programming tools and techniques, digital storage media, and communication networks. A computing device may include a processor such as a microprocessor, microcontroller, logic circuitry, or the like. The processor may include a special purpose processing device such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device such as non-volatile memory, static RAM, dynamic RAM, ROM, CD-ROM, disk, tape, magnetic, optical, flash memory, or other machine-readable storage medium. Various aspects of certain embodiments may be implemented using hardware, software, firmware, or a combination thereof.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1 illustrates a system 100 for determining location information of an operator 105 using a three-dimensional location sensor 155 of an electronic device 150. The location information of the operator 105 may be associated with the location of the head and/or eyes 107 of the operator 105 relative to an electronic display 160 of the electronic device 150. The location information may be used to calculate a parallax value associated with the viewing angle of the operator relative to the electronic display 160.

The electronic display 160 may be configured to display an interactive graphical user interface. The electronic device 150 may include a touch screen digitizer configured to receive inputs via a touch implement contacting a touch surface of the touch screen digitizer. The touch screen digitizer may be integrated into the electronic display 160. The electronic display 160 may comprise any of a wide variety of electronic displays, including LCD displays, LED displays, and OLED displays.

The three-dimensional location sensor 155 may comprise one or more optical cameras, non-optical cameras, RADAR range sensors, LASER range sensors, ultrasonic range sensors, focus range sensors, phase detection systems, contrast detection systems, active focus range sensors, and/or other sensor(s).

The three-dimensional location sensor 155 may be configured to determine location information of the head of the operator 105, one or more eyes 107 of the operator 105, a mid-point between the eyes 107 of the operator 105, a line of sight vector of the operator 105 to a location on a touch surface of the electronic device 150, a closest eye 107 of the operator 105, and/or the location of a dominant eye 107 of the operator 105. In some embodiments, the three-dimensional location sensor 155 may utilize facial recognition to determine location information of the head and/or eyes 107 of the operator 105. The system may determine that an eye 107 is closed and perform calculations based on location information of the other eye of the operator 105.

Figure 2:
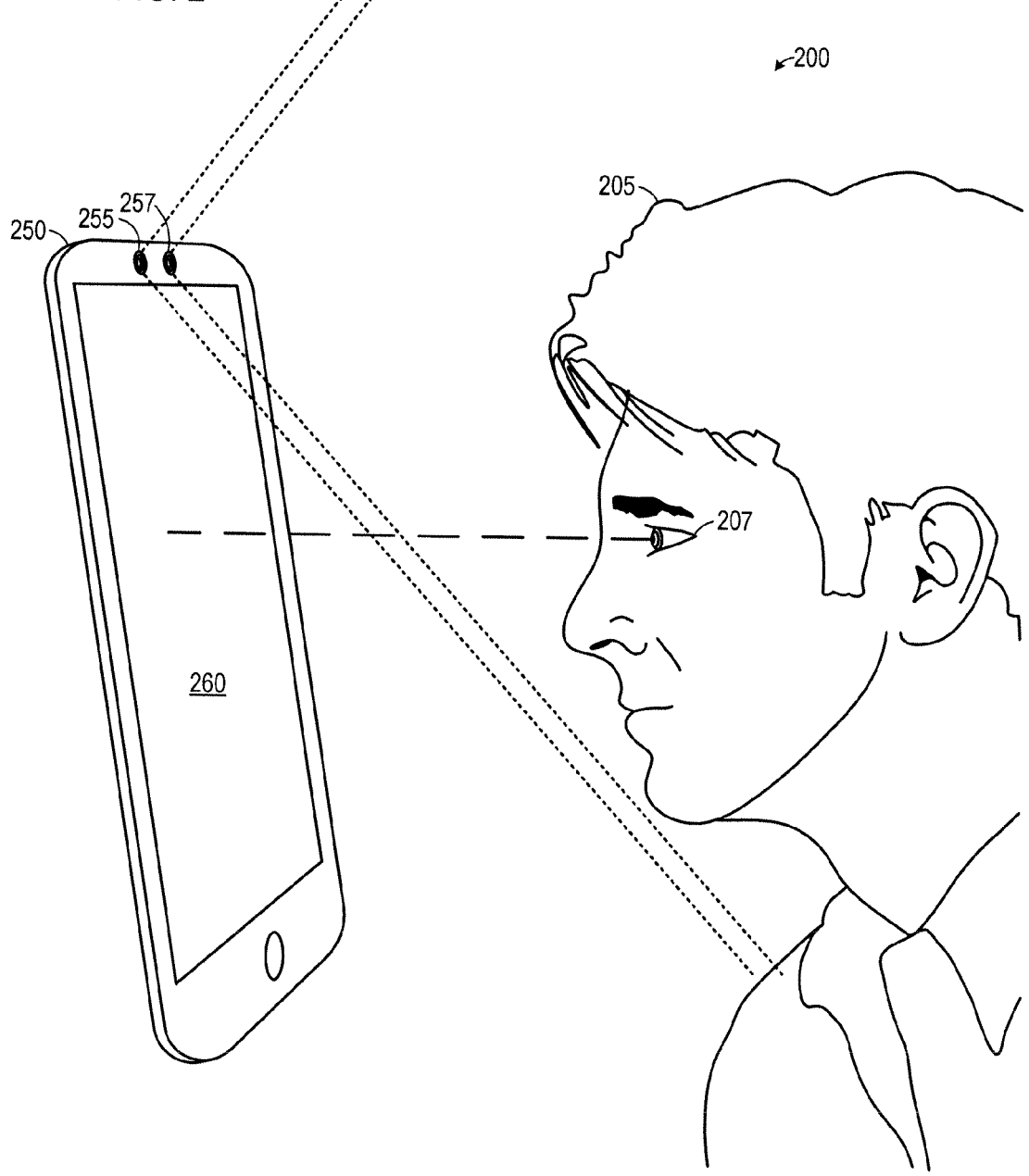
FIG. 2 illustrates dual three-dimensional location sensors of an electronic device used to calculate a parallax value associated with the viewing angle of the operator.

FIG. 2 illustrates a system 200 in which dual three-dimensional location sensors 255 and 257 are used to determine location information of a head and/or eyes 207 of an operator 205. An electronic device 250 may include an electronic display 260. The location information obtained using the dual three-dimensional location sensors 255 and 257 may be used to calculate parallax values associated with the viewing angle of the operator 205 relative to the electronic display 260. As previously described, the three-dimensional location sensors 255 and 257 may incorporate any of a wide variety of sensor types.

The illustrated electronic device 250 is merely provided as an example. The presently described systems and methods are applicable to a wide range of display types and electronic device types, including, but not limited to, portable electronic devices, televisions, computer monitors, mobile phones, tablets, laptops, automated teller machines, ticket booths, electronic input machines of any variety, and/or any other electronic device configured with an electronic display and configured to receive touch inputs on a display surface other than the actual surface displaying content.

Figure 3:
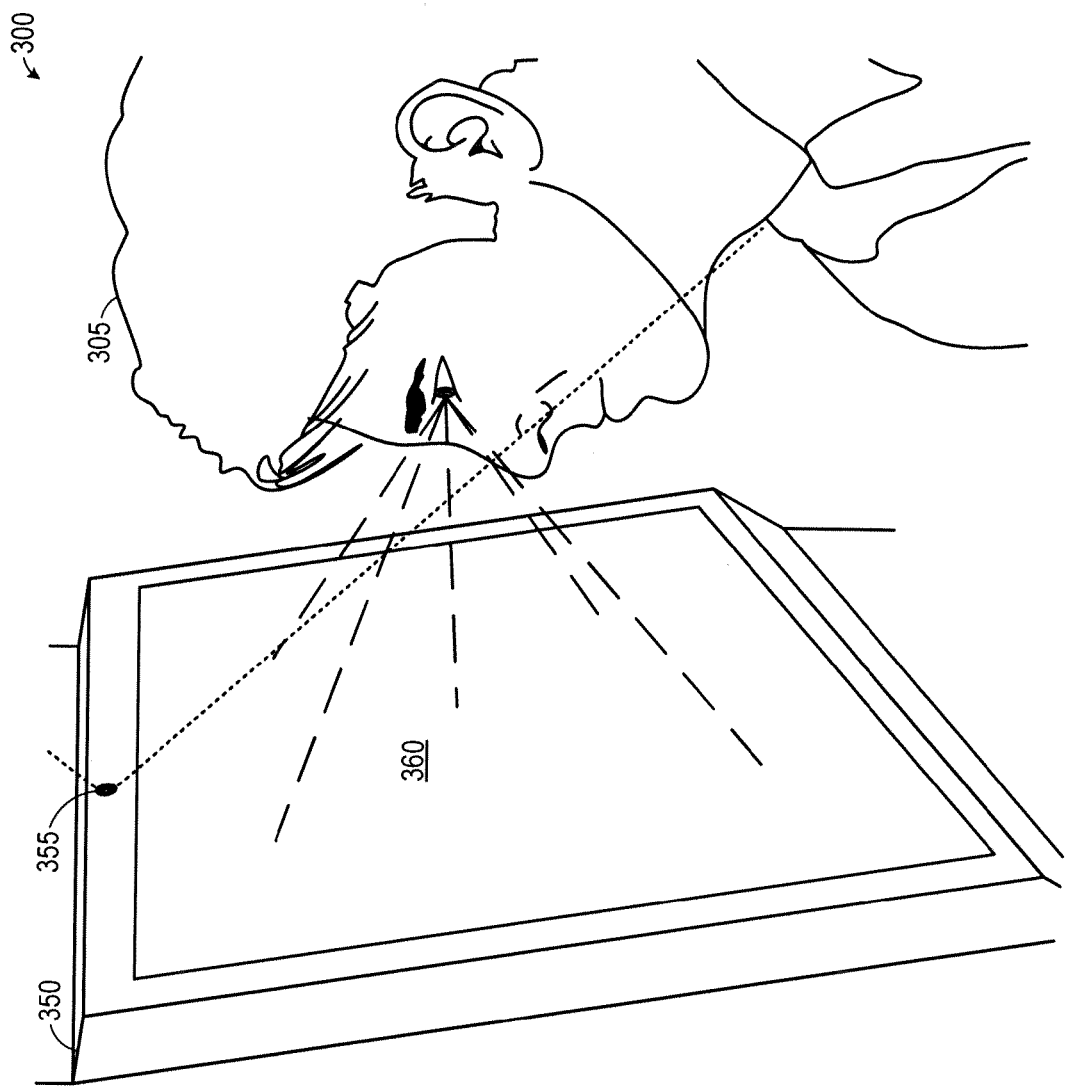
FIG. 3 illustrates a relatively large electronic device configured with a three-dimensional location sensor for calculating a plurality of parallax values associated with the viewing angles of the operator.

FIG. 3 illustrates an example of a system 300 in which a relatively large electronic device 350, such as an automated teller machine or a ticket purchasing machine, includes a three-dimensional location sensor 355 for calculating a plurality of parallax values associated with the viewing angles of the operator 305. On a large electronic display 360, a parallax value for each of the various viewing angles may be determined, either calculated or derived, as is described in greater detail below.

Figure 4A:
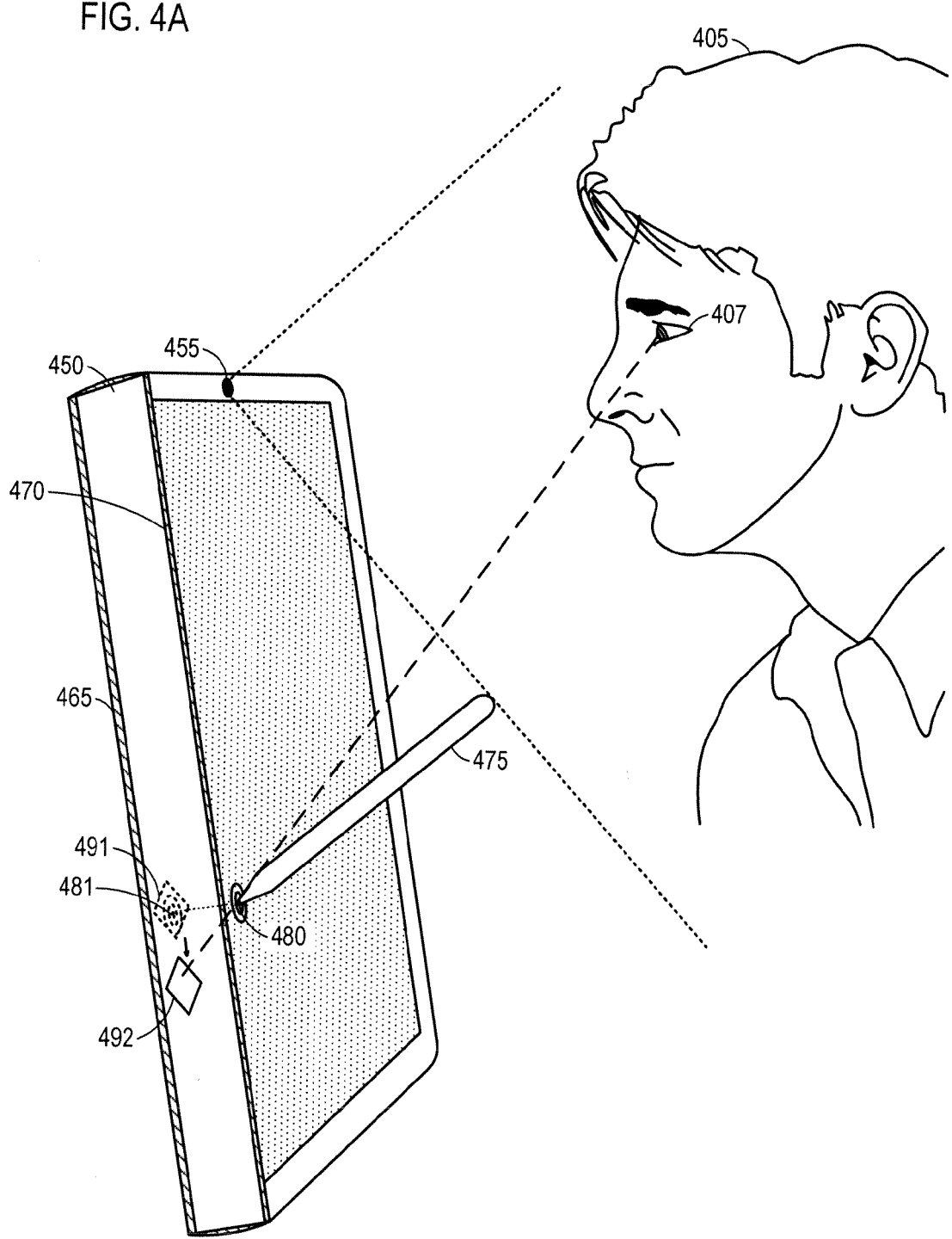
FIG. 4A illustrates a contact by a touch implement to input an object for display along a line of sight of an operator, the displayed object offset using a parallax value.

FIG. 4A illustrates a contact by a touch implement 475 to input an object 492 along a line of sight of an operator 405. As illustrated, an electronic device 450 may include an electronic display 465 and a touch surface 470 separated by a distance. The distance may be greater or smaller depending on the electronic device. In the illustrated embodiments, the distance is shown sufficiently large to illustrate the principles and objectives of the presently described systems and methods.

According to various embodiments, the electronic display 465 may be any type of display, including, but not limited to, an LCD display, an LED display, and/or an OLED display. The touch screen digitizer may be a separate component from the electronic display 465 and/or may be integral with the electronic display 465. The touch screen digitizer, including the touch surface 470, may include a resistive touch surface, a surface acoustic wave touch surface, a capacitive touch surface, an infrared detection touch surface, and/or any other touch sensitive technology suitable for an electronic device 450.

The touch implement 475 is illustrated as a stylus in the various illustrations. However, any of a wide variety of touch implements 475 may be utilized, including, but not limited to, a finger of the operator 405, a plurality of fingers of the operator 405, a stylus, a manually controlled pointing device controlled by the operator 405, a hand of the operator, and/or other contacting device. In some embodiments, the touch surface 470 may be configured to receive touch inputs in an electromagnetic form. Accordingly, the touch implement 475 may be an electromagnetic radiation pointing device configured to impart a contact in the form of electromagnetic radiation. For example, the pointing device may be a LASER pointer.

The illustrated embodiment shows a line of sight connecting an eye 407 of the operator 405 to a displayed object 492 on the electronic display 465. The displayed object 492 is illustrated as a diamond shape. However, the displayed object 492 may be any displayed content, including, but not limited to, a signature, part of a graphical user interface, an icon, a picture, text, a geometric shape, a button, a graphic, a slider, an image, and/or audiovisual content or controls, and/or any other displayable content or displayable object.

The illustrated embodiment shows that an operator, intending to input the displayed object 492 with the stylus 475, may contact the touch surface 470 at a contact location 480 along his line-of-sight to the intended location of displayed object 492. The object 492 may be referred to as a displayed object 492 for an object that is displayed prior to the contact with the touch surface 470 or as in input object 492 for an object that is input or drawn by the contact with the touch surface 470, or the terms may be used interchangeably. The contact location 480 on the touch surface 470 may correspond to a location 481 on the electronic display 465 that is perpendicular to the contact location 480 on the touch surface 470. This can lead to the electronic device incorrectly inputting input object 492 at the location 481, rather than at its intended location at 492.

Accordingly, rather than incorrectly displaying the input object 492 at the perpendicular location 491 corresponding to the perpendicular contact location 481, a parallax value may be used to offset the displayed object 492 such that it is within the line of sight of the operator 405. Thus, the input object 492 may be displayed at an intended location (at 492) rather than the location 481 perpendicular to the actual contact location 480.

According to various embodiments, the parallax value may be calculated based on the location information of the head and/or eyes 407 of the operator 405. A three-dimensional location sensor 455 may be used to calculate one or more parallax values for one or more locations on the touch surface 470. One or more additional parallax values may be derived using the calculated parallax value(s).

Another example of the illustrated functionality relates to the input of a signature. If the operator 405 intended to input a signature using the stylus 475 along a horizontal line beginning at the location of the object 492, the operator would initially contact the location 480. If the signature were mapped to locations (beginning at 481) perpendicular to the contact location 480, the operator's signature would be higher on the display than intended. By offsetting each of the contacts (beginning at 481) using the parallax values calculated and/or derived from the location information obtained by the three-dimensional location sensor 455, the signature may be vertically offset to the intended location (beginning at 492). The signature may comprise a plurality of mapped locations that are interpolated to form a continuous segment. Similarly, a plurality of mapped contacts may be used to generate an object offset by the parallax value.

In other embodiments, the contact by the stylus 475 may be used to generate a response with a graphical user interface. A response at the perpendicular location 481 would be erroneous and not intended by the operator 405. However, by remapping the contact location 480 to the location (at 492) on the electronic display using the parallax value, an input may be provided via the stylus 475 at the intended contact location along the line of sight of the operator 405.

In some embodiments, the contact location 480 on the contact surface 470 may be directly mapped to the offset location on the electronic display 465 using the parallax value. In other embodiments, the contact location 480 may be mapped to an offset location on the contact surface 470 and then perpendicularly mapped to the offset location on the electronic display 465.

In addition to using the location information obtained via the three-dimensional location sensor 455, the parallax value may be calculated, at least partially, based on the detected contact location 480 on the touch surface 470 and/or a location of displayed content on the electronic display 465.

Figure 4B:
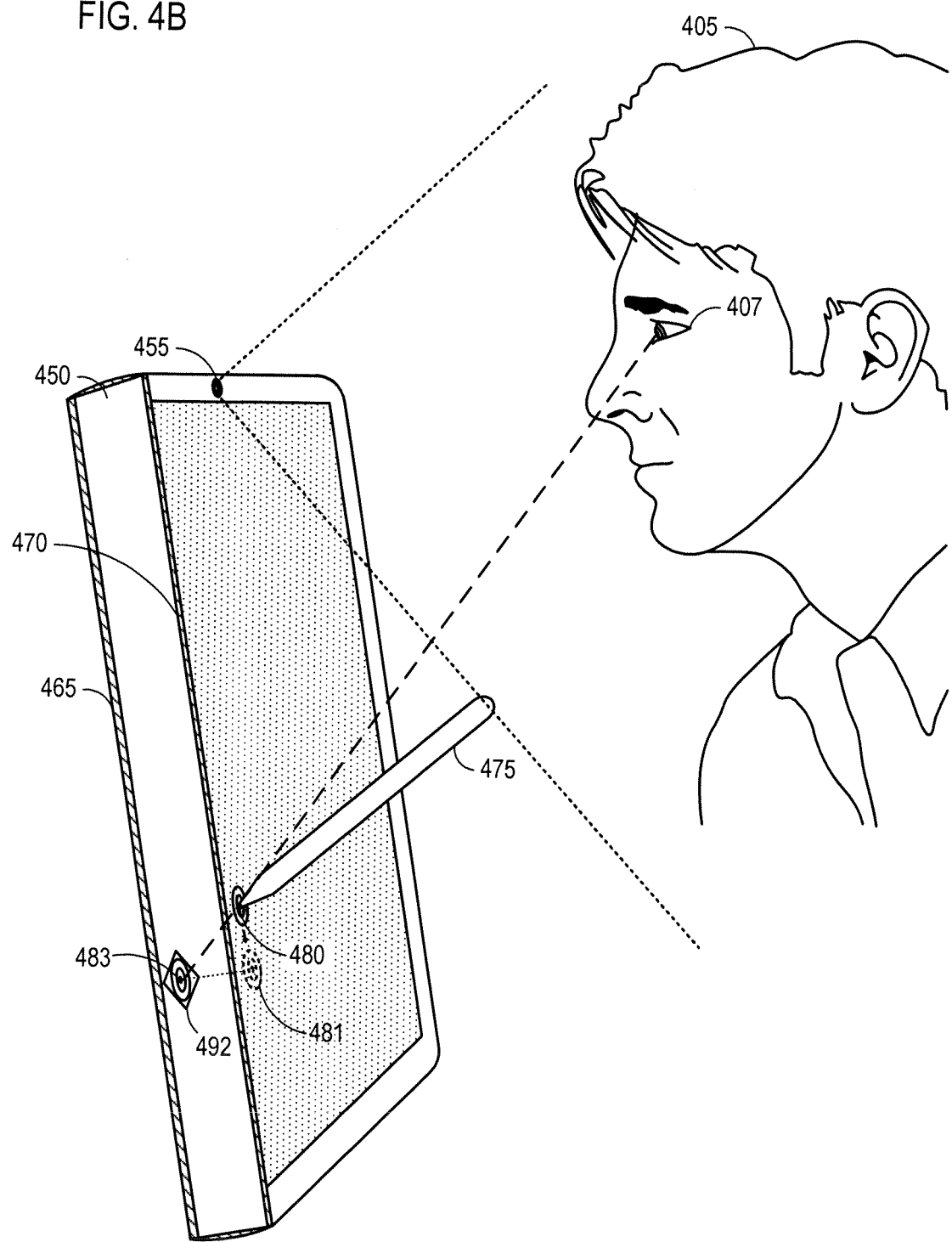
FIG. 4B illustrates the contact location of a touch implement remapped to correspond to the intended contact location using the calculated parallax value.

FIG. 4B illustrates the contact location 480 of a touch implement 475 remapped to correspond to the intended contact location 483 using a calculated parallax value. As illustrated, the contact location 480 may be remapped to either the intended contact location 483 on the electronic display 465 or to an offset location 481 on the touch surface 470. The intended contact location 483 on the electronic display 465 may not be perpendicular to the actual contact location 480 on the touch surface. However, by remapping the contact location 480 using a parallax value, the contact 480 by the operator 405 may be remapped to a location 481 or 483 such that the resulting contact is effective at the intended site 492 along the line of sight of the operator on the electronic display 465.

Comparing FIGS. 5A and 5B, it can be seen that the perceived contact location (at 592) of the operator 510 may not be the same as the actual contact location 581 on the electronic display 565 (using a perpendicular mapping). As illustrated, an electronic display 550 may include a three-dimensional location sensor 555 for determining location information of a head and/or eye 507 of the operator 510. The electronic display may include an electronic display 565 and a touch surface 570. Touch inputs via a stylus 575 or other touch implement on the touch surface 570 may normally be perpendicularly mapped to a corresponding location on the electronic display 565. As illustrated in FIG. 5A, following the line of sight of the operator 510, an operator 510 may use the stylus 575 to contact a displayed object 592. The operator may perceive that he or she is directly contacting the displayed object 592 with the tip of the stylus 575.

As illustrated in FIG. 5B, the reality is that the stylus 575 may be contacting the touch surface 570 at the location 580 that is above the location perpendicular to the displayed object 592 on the touch surface 570. In will be appreciated by one of skill in the art that any change in the position of the operator 510 relative to the electronic device 550 would alter the line of sight and the parallax effects resulting therefrom. The contact location 580 on the touch surface may normally be mapped to the location 581 on the electronic display. However, using a parallax value, calculated and/or derived using the location information obtained via the three-dimensional location sensor 555, the contact location 580 may be remapped to a location on the touch surface 570 which is perpendicular to the intended object 592.

In various embodiments, the electronic device 550 (e.g., a processor within the electronic device) may calculate a parallax value based on the location information of the head of the operator 510 relative to the electronic display 565. The electronic device 550 may also map a detected contact location by the touch implement 575 with the touch surface 570 to a perceived contact location (at 592) using the calculated parallax value. The electronic device 550 may map the contact locations of subsequent contacts by the touch implement 575 with the touch surface 570 to corresponding locations on the aligned electronic display 565 using the calculated parallax value.

In some embodiments, the electronic device 550 may derive one or more additional parallax values for one or more additional locations on the electronic display using the location information of the head and/or eye 507 of the operator 510. The electronic device 550 may utilize the derived parallax values to offset at least a portion of displayed content on the electronic display 565. The electronic device 550 may utilize the derived parallax values to map the contact locations of subsequent contacts by the touch implement 575 with the touch surface to corresponding locations on the aligned electronic display 565 using the plurality of parallax values. In some embodiments, the electronic device 550 may derive each of the plurality of parallax values for the plurality of potential contact locations on the touch surface by interpolating one or more parallax values calculated using the location information obtained by the three-dimensional location sensor 555.

The actual contact location 580 may be mapped to the perceived contact location (at 592) by calculating a distance offset between the detected contact location 580 of the touch implement 575 with the touch surface 570 and the perceived contact location (at 592) on the electronic display. The distance offset may be based on the parallax angle (line of sight) and the perpendicular separation between the touch surface 570 and a surface of the electronic display 565. For example, the distance offset may be based on the product of the separation and a tangent of a parallax angle. The offset may comprise vertical and/or horizontal components, i.e., components along in-plane unit vectors x and y.

In some embodiments, the electronic device 550 may be configured to calculate a parallax value based on the location information of the head of the operator 510 relative to the electronic display 565 and use the parallax value to offset at least a portion of the displayed content on the electronic display 565. The parallax value for each detected contact position by the touch implement 575 may be different and/or independently calculated or derived.

In some embodiments, the electronic device 550 may receive a first contact at a first location on the touch surface corresponding to a first perceived contact location determined based on the location information of the head of the operator 510 when the first contact location was received. The electronic device 550 may then receive a second contact at a second location on the touch surface corresponding to a second perceived contact location determined based on the location information of the head of the operator 510 when the second contact location was received.

A portion of the displayed content corresponding to the first perceived contact location of the touch implement with the electronic display may be shifted from the first perceived contact location to the second perceived contact location. Any number of subsequent contact locations and perceived contact locations may be determined and the content may be continually translated or incrementally translated between two or more perceived contact locations.

In one embodiment, the electronic device 550 may be configured to receive a contact location of the touch implement 575 with the touch surface 570 and determine a corresponding perceived contact location (at 592) of the touch implement with the electronic display 565 based on location information of the head and/or eyes 507 of the operator 510 at a first time. The electronic device 550 may then identify a portion of the displayed content corresponding to the first perceived contact location (at 592). The electronic device 550 may then determine a second perceived contact location (not shown) of the touch implement 575 with the electronic display 565 based on location information of the head of the operator 510 at a second time. The displayed content may then be shifted from the first perceived contact location 592 to the second perceived contact location (not shown).

Accordingly, the operator 510 may perceive the displayed content as remaining stationary relative to the contact location of the touch implement 575. The displayed content may be identified as being at a location on the electronic display 565 on a line of sight between the operator 510 and the contact location 580 of the touch implement 575 with the touch surface 570. While the actual location of the displayed content changes as the operator's line of sight does, the operator perceives it as stationary, because the displayed content remains on his line of sight through the contact location 580.

Figure 6:
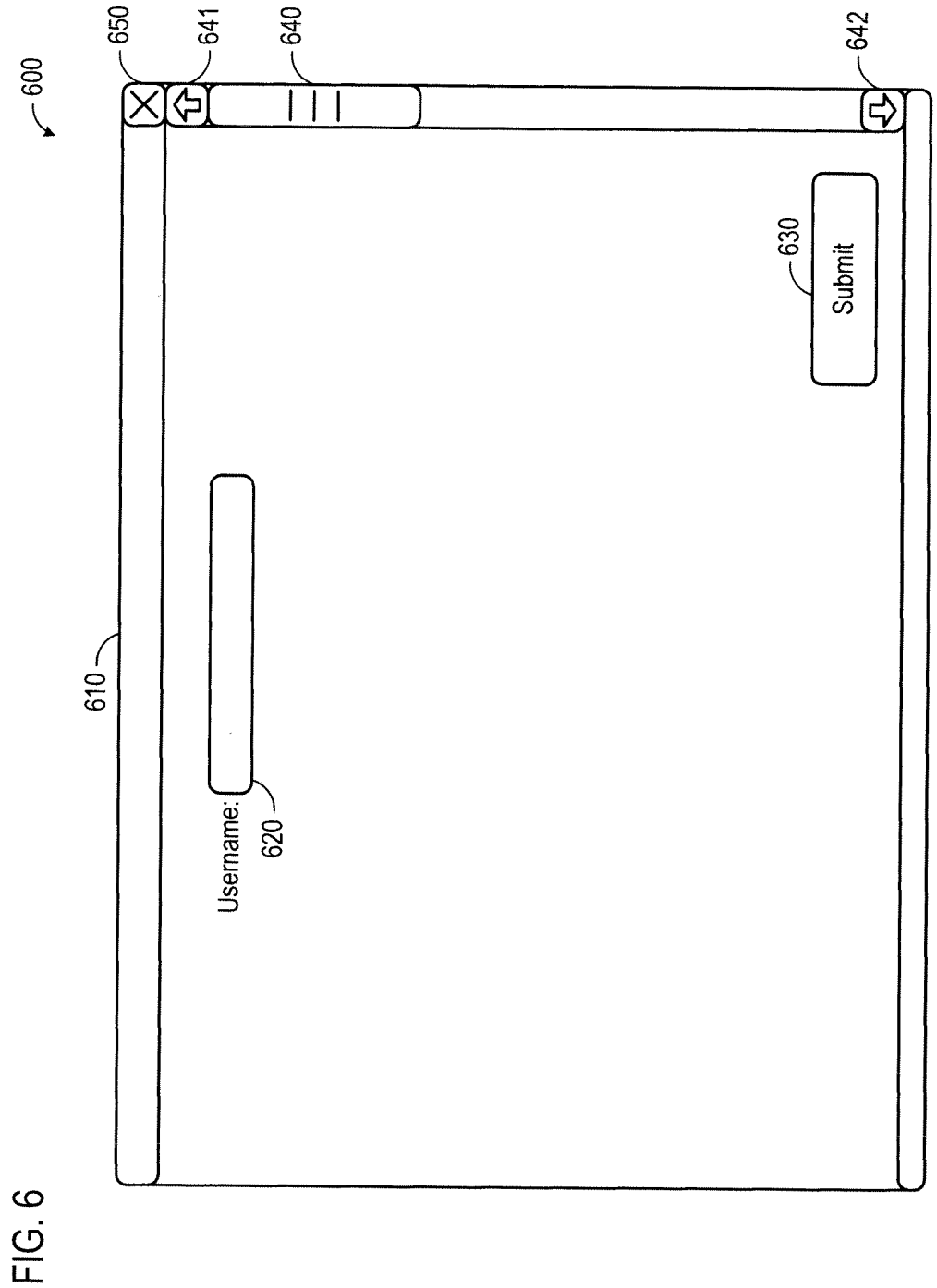
FIG. 6 illustrates a displayed object requesting an operator input via a touch implement, the input used to determine a parallax value.

FIG. 6 illustrates a graphical user interface 600 including displayed objects 620 and 630 requesting an input from an operator via a touch implement. In the example illustration, the graphical user interface 600 includes a menu bar 610, a close box 650, and scrolling inputs 641, 640, and 642. A contact by a touch implement (e.g., a finger or stylus) anywhere on the graphical user interface 600 may be used to calculate a parallax value. However, contacts at specific locations, where it is readily recognizable where the intended contact was, may be used to accurately determine a parallax value for a specific contact location. Parallax values for other contact locations or even all other contact locations may be derived using the calculated parallax values.

For example, if a user selects the submit icon 630 using a stylus, and the actual contact location on a touch surface of the electronic device is to the left and above the contact location on the touch surface that is perpendicular to the displayed submit icon 630, a parallax value may be calculated that indicates that the operator is likely viewing the display from above and to the left of a perpendicular viewing angle. Similarly, the username object 620 may be used to determine parallax values for associated contacts. In like manner, a contact with any of a wide variety of icons, objects, or other displayable content may be used to calculate parallax values. In some embodiments, the displayable content may incorporate smaller-sized aim-points within a larger-sized content region, allowing higher precision parallax values to be calculated.

In various embodiments, the parallax values calculated and derived during a calibration mode may be unobtrusive and/or not apparent to the user at all. For example, an operator may select the scroll down icon 642 to scroll a page. A contact by a touch implement near the arrow for the scroll down icon 642 may be associated with an intended contact location corresponding to a location on the touch surface perpendicular to the scroll down icon 642. Any offset in the actual contact by the touch implement on the touch surface near the intended contact location may be used to calculate a parallax value.

Thus, a parallax calculation module (potentially comprising instructions within computer readable memory and/or media that are executable by a processor) may display a plurality of touch-inducement objects (e.g., username icon/object 620 and submit icon/object 630) within a graphical user interface 600. The intended contact locations may be readily apparent and assumed to be contact locations on the touch surface perpendicular to the displayed objects 620, 630, 640, 641, and/or 642.

A comparison of an actual contact location on the touch surface and the apparent intended contact location may be used to calculate distance offsets between each of the plurality of contact locations of the touch implement with the touch surface and the respective intended contact locations. The parallax calculation module may thereby calculate parallax values for each of the plurality of contact locations of the touch implement with the touch surface using the calculated distance offsets.

In some embodiments, parallax values for each of a plurality of potential contact locations may be derived using the calculated parallax values and/or calculated distance offsets. Subsequent contacts and/or displayed content may be offset and/or shifted using the calculated and/or derived parallax values.

Figure 7:
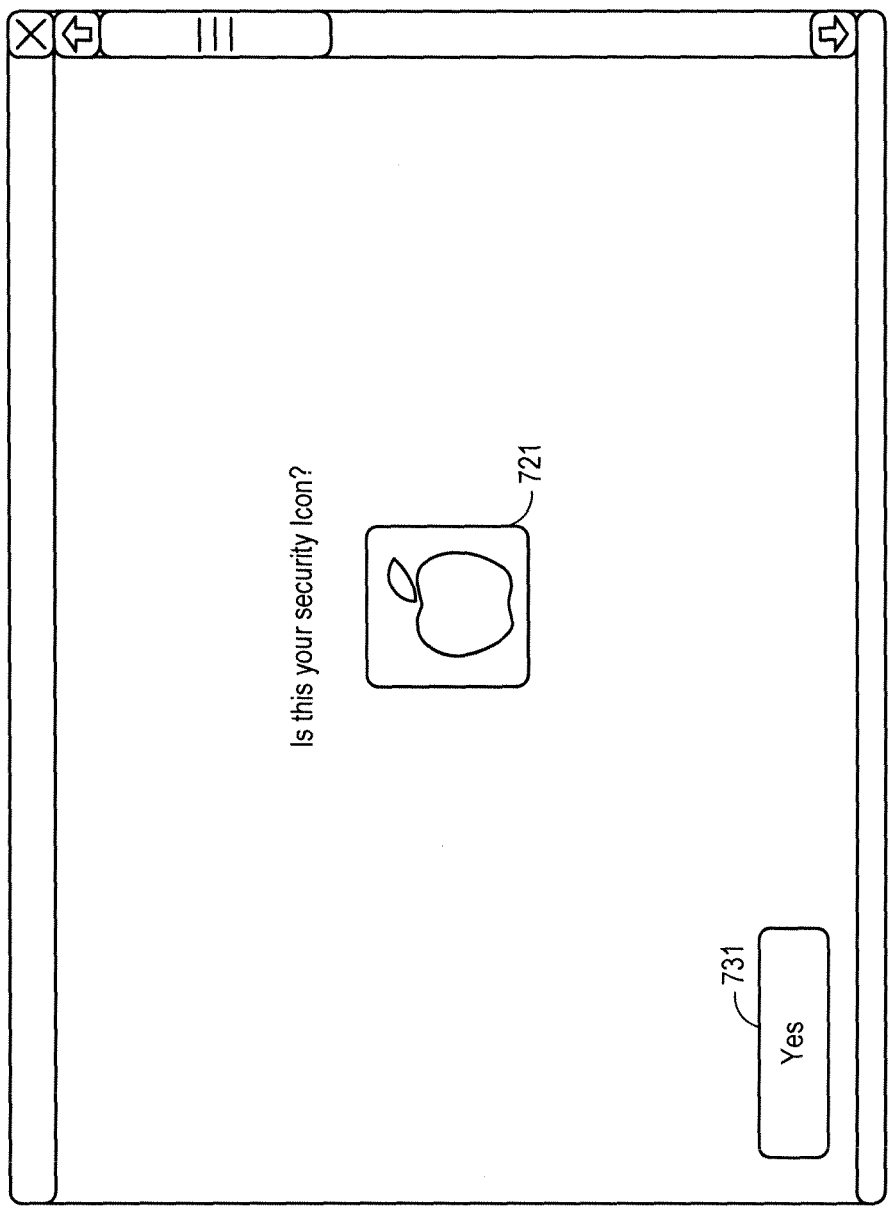
FIG. 7 illustrates another displayed object requesting an operator input via a touch implement in a second location for determining a second parallax value.

FIG. 7 illustrates another example of a graphical user interface 701 displaying touch-inducement objects 721 and 731. As previously described, displayed objects inducing an operator to provide a touch contact via a touch implement at a specific location may be used to determine a distance offset between the contact location perpendicular to the displayed object and the actual contact location of the touch implement. The distance offset may correspond to the line of sight of the operator relative to the display surface of the electronic device. The distance offset may be used to determine a parallax value associated with the contact location and potentially allow parallax values of other contact locations to be derived.

In some embodiments, the graphical user interface may be configured to display a sequence of objects in various locations each requesting a contact input. The sequence of objects may be displayed as part of a login process, an initiation process, and/or other normal usage process.

Figure 8:
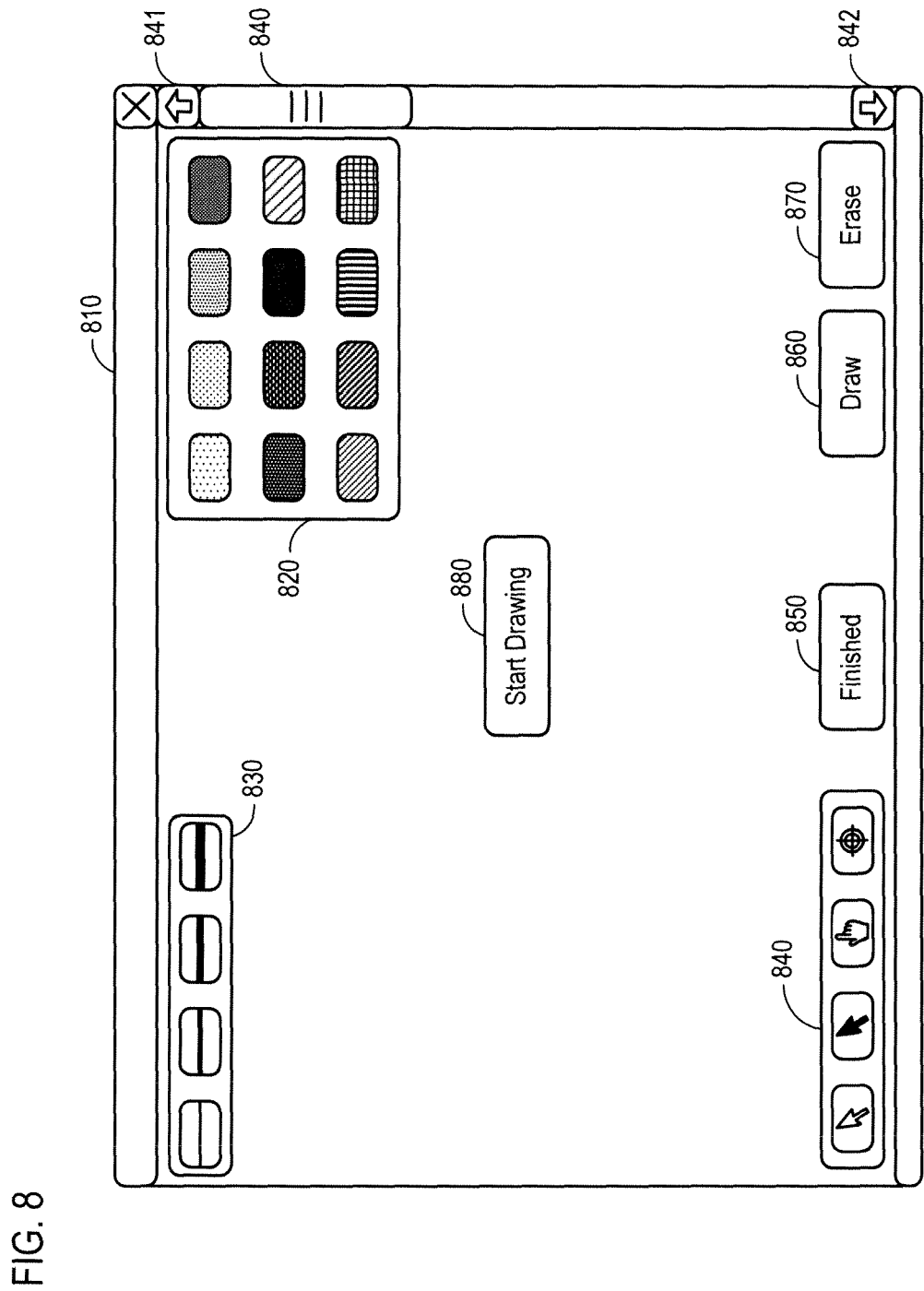
FIG. 8 illustrates a drawing interface configured to utilize contacts by a touch implement to select application specific settings and to determine one or more parallax values.

FIG. 8 illustrates a drawing interface 810 configured to allow an operator to draw and/or create other graphical objects. In one embodiment, the user may begin by selecting a start icon 880. In order to begin drawing a user may then select a line width 830, a shading 820, a controller 840, and/or other icon, such as the finished icon 850, draw icon 860, and/or erase icon 870. The electronic device may associate an intended contact location on a touch surface with each of the displayed icons at locations perpendicular to the displayed icons. Thus, for example, if a user selects the thickest line thickness at 830, the electronic device may compare the detected contact location of a touch implement on the touch surface with the intended contact location to determine a distance offset between the two.

The distance offset may then be used to calculate a parallax value. Similarly, as the user continues to draw and select various icons, additional parallax values may be calculated for various locations on the touch surface. One or more calculated parallax values may be used to determine (e.g., derive via interpolation) parallax values for any number of potential contact locations. In some embodiments, as additional calculated parallax values are obtained, the derived parallax values may be continually or conditionally updated.

In some embodiments, the update may simply replace older values with newer ones. Alternatively, the update may involve averaging the newer value with previously derived parallax values at the same, or nearby, locations. Such averages may give more weight to more recently derived parallax values. In some embodiments, the time-since-last-parallax-derivation may be used to direct the graphical user interface to display an object requesting a contact input. Such determinations may be location-based. For example, a system may determine that the left side of the display has not derived a new parallax value for a predetermined time (e.g., 10 minutes) and so request (unobtrusively or not) a touch input on that side of the display.

In some embodiments, the update can be based on changes in the orientation of the electronic display (e.g., as determined by on-board accelerometers). In some embodiments, newer parallax values are prioritized or given additional weight when they are sufficiently different from previously determined ones. Drastic changes in calculated parallax values may be indicative of a change in the location of an operator's head and/or in the orientation of the electronic display.

In some embodiments, a user must select one or more of these icons in order to begin drawing. In other embodiments, the user may begin drawing, but as he or she continues drawing and selecting icons, the accuracy of the contacts and/or displayed content may be improved as parallax values are calculated and/or derived for various contact locations.

Figure 9:
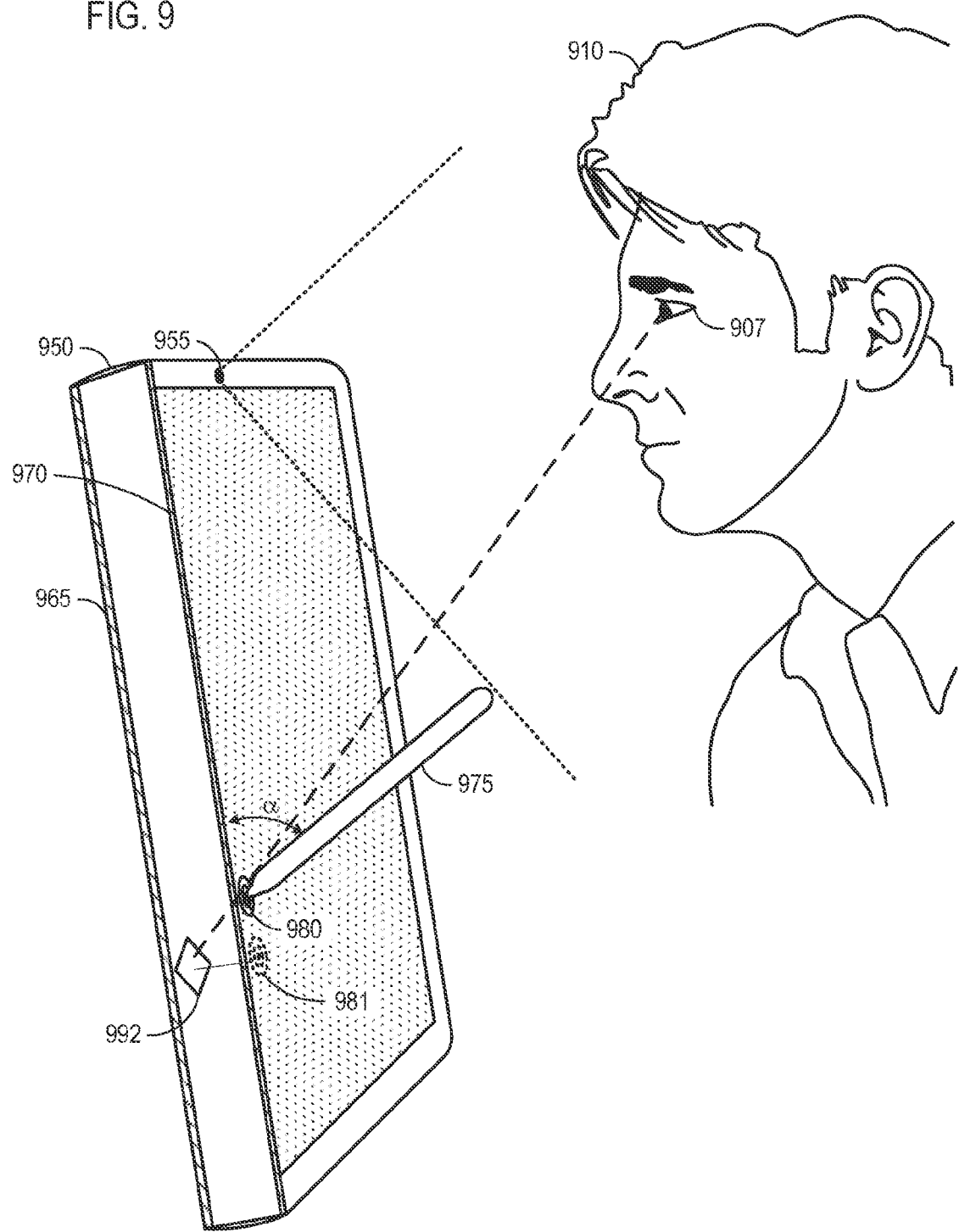
FIG. 9 illustrates an electronic device configured to calculate one or more parallax values using location information of an operator in conjunction with an angle of inclination of a touch implement relative to an electronic display.

FIG. 9 illustrates an electronic device 950 configured to calculate one or more parallax values using location information of an operator 910 in conjunction with an angle of inclination α of a touch implement 975 relative to an electronic display 965. As may be appreciated by one of skill in the art, the line of sight of the operator 910 to a displayed object and/or contact location 992 may intersect a contact point 980 of the touch implement 975. The line of sight of the operator may intersect a location on the touch implement 975 other than the actual contact location 980 of the touch implement 975 depending on the shape, size, and dimensions of the touch implement 975 as well as the angle of inclination α of the touch implement 975 relative to the touch surface 970.

For example, in the illustrated embodiment, the touch implement 975 may have a tapered point and the line of sight may intersect the broad, un-tapered portion of the touch implement 975. The angle of inclination α of the touch implement may affect the resulting parallax effect of the viewing angle of the operator 910 using the touch implement 975. Accordingly, the electronic device 950 may utilize a location sensor 955 (in some embodiments it may be a three-dimensional location sensor) to determine location information of the head and/or eyes 907 of the operator 910. The location information may be used to determine a distance offset between a contact location 980 of the touch implement and an intended contact location 981 perpendicular to the displayed object 992. The distance offset between the contact locations 980 and 981 may be used to calculate a parallax value for the contact location. Additionally, the angle of inclination α may also be used to calculate and/or adjust the parallax value for the contact location.

A contact location and/or a displayed object may be shifted and/or offset based on the calculated parallax value. In some embodiments, the contact location 980 may be mapped to the contact location 981 on the touch surface using the parallax value. The contact location 981 may then be mapped or interpreted as contacting the displayed object or contact location 992 on the electronic display. Alternatively, the contact location 980 may be directly mapped or interpreted as contacting the displayed object or contact location 992.

In various embodiments, the touch implement 975 may be a finger, a stylus, and/or other touch implement as described herein. The electronic device 950 may include a touch implement inclination detection system configured to determine the angle of inclination α of the touch implement 975. For example, the touch implement 975 may include an accelerometer and be configured to communicate with the electronic device 550. The touch implement may additionally or alternatively include a gyroscope, a plurality of accelerometers, a camera, a magnetic detection system, and/or other sensory system or communication system for determining an angle of inclination and communicating a determined angle of inclination to the electronic device. In some embodiments, the electronic device 950 may include one or more cameras, magnetic detection systems, and/or other sensory equipment for determining the angle of inclination α of the touch implement 975.

Figure 10A:
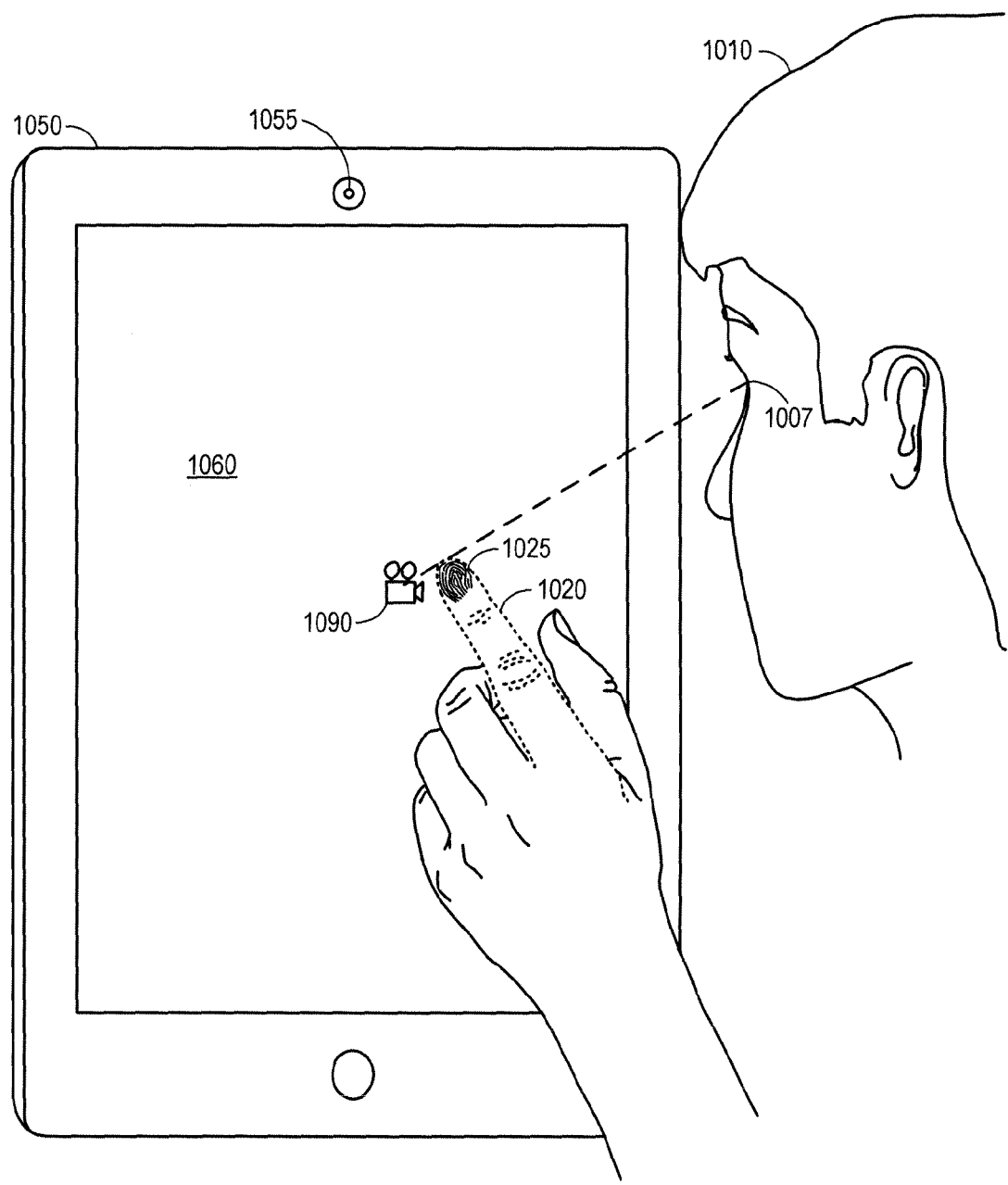
FIG. 10A illustrates a finger contact of a finger of an operator along a line of sight of the operator with a displayed object, the finger contact offset from the contact location perpendicular to the displayed object.

FIG. 10A illustrates a finger contact 1025 of a finger 1020 of an operator 1010 along a line of sight of the eye 1007 of the operator 1010 with a displayed object 1090. As illustrated, the perpendicular drawing perspective shows that the finger contact 1025 is to the right of the actual displayed object 1090. However, from the angled view of the operator 1010, the finger contact 1025 may appear to be on top of the displayed object 1090. As described in various embodiments herein, a parallax value may be calculated (or previously calculated) and used to offset the finger contact 1025 and/or the displayed object 1090. For example, a parallax value may be calculated based on location information of the operator 1010 obtained via a location sensor 1055. The location sensor 1055 may be a three-dimensional location sensor.

Figure 10B:
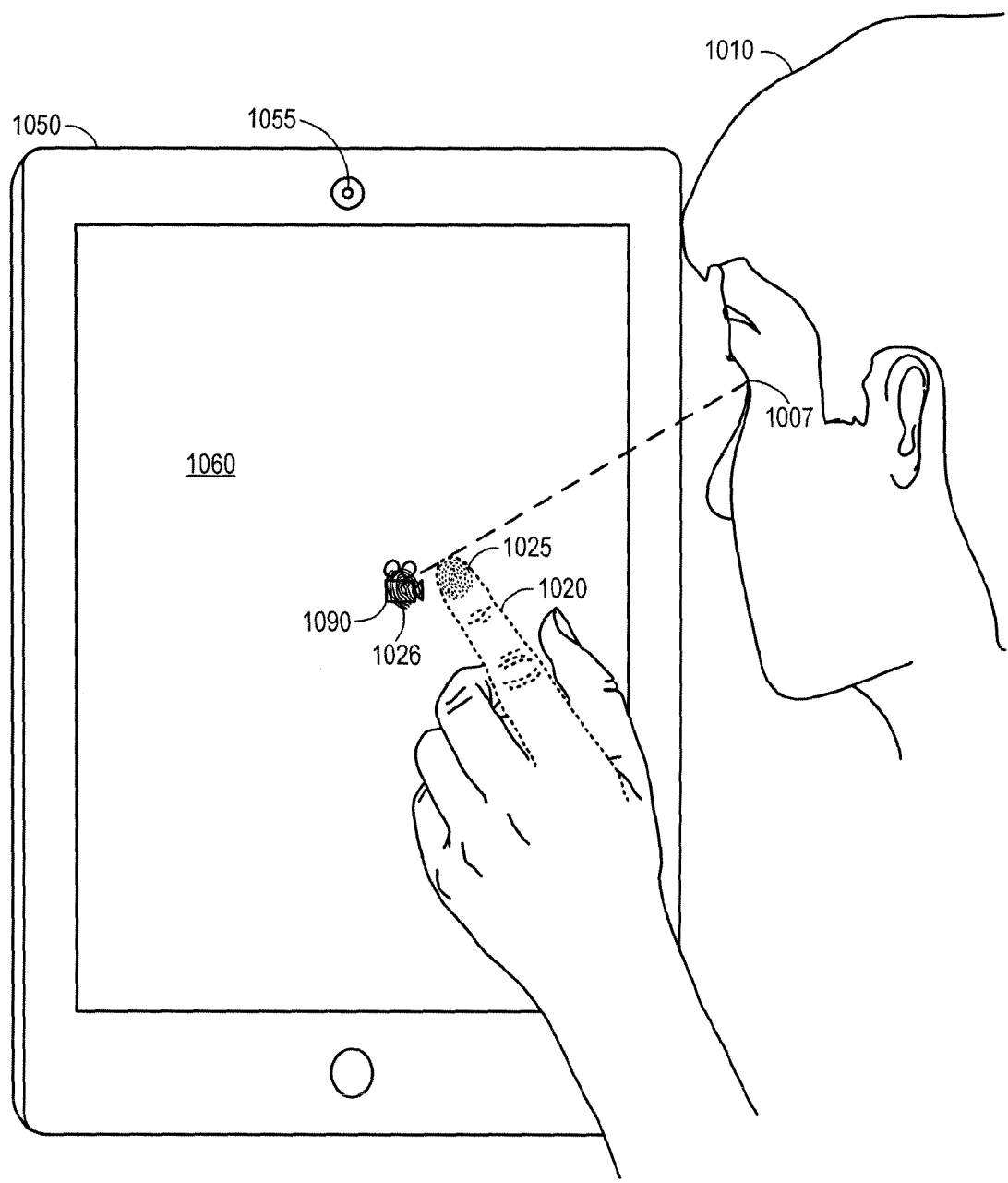
FIG. 10B illustrates the finger contact remapped to the contact location perpendicular to the displayed object using a calculated parallax value based on three-dimensional location information of the operator.

FIG. 10B illustrates the finger contact 1025 remapped to the contact location 1026 perpendicular to the displayed object 1090 using a calculated parallax value based on three-dimensional location information of the operator 1010. As illustrated in both FIGS. 10A and 10B, the finger contact 1025 of the finger 1020 may not be very precise (illustrated as the fingerprint). Accordingly, it may be useful to determine a centroid or other precise location using the finger contact 1025.

Figure 10C:
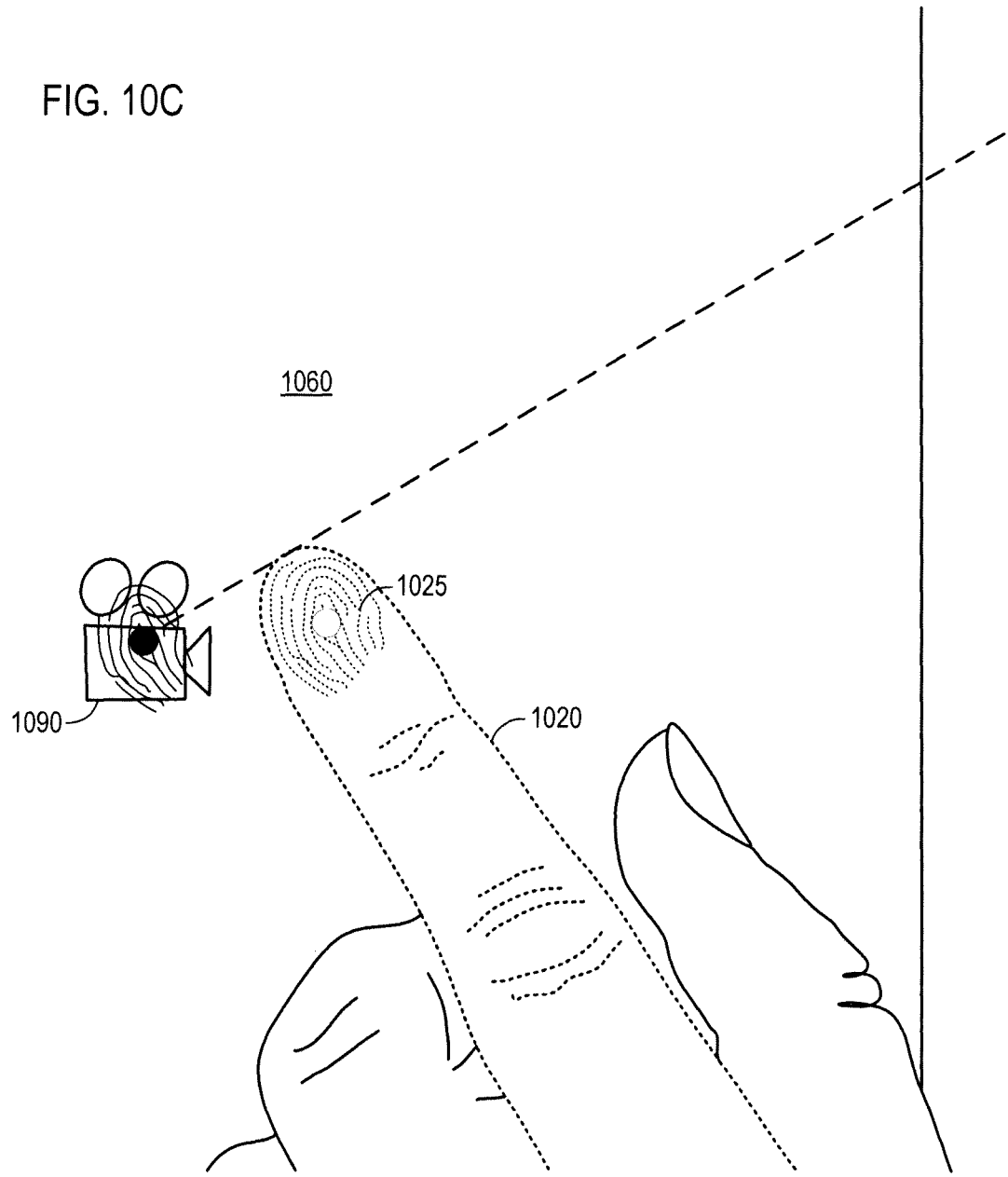
FIG. 10C illustrates a centroid of the finger contact being mapped from the actual contact location on the touch surface to the contact location perpendicular to the displayed object on the touch surface.

FIG. 10C illustrates a centroid of the finger contact 1025 being mapped from the actual contact location on the touch surface 1060 to the contact location perpendicular to the displayed object 1090 on the touch surface 1060. According to various embodiments, the electronic device 1050 may identify a plurality of contact points within a contact region of a finger contact 1025 with the touch surface 1060 and map the location of each of the plurality of contact points of the finger contact 1025 with the touch surface 1060 to a location on the electronic display using one or more parallax values.

The plurality of contact points of the finger contact 1025 that are mapped may be on the perimeter of the contact region of the finger contact with the touch surface. In other embodiments, the mapped contact points may exclude contact points on the perimeter of the contact region of the finger contact 1025, may be arbitrarily selected within the contact region, may be randomly selected within the contact region, may be selected with bias toward selecting contact points toward a centroid of the contact region, and/or may be selected with bias toward the perimeter of the contact region.

The determination that the contact region of the finger contact 1025 intersects an actionable target region of the touch screen can be based on the degree of overlap between the contact region of the finger contact 1025 and the target region, rather than simply defining a centroid for the finger contact 1025 and determining whether or not it lies within the target region. In some embodiments, portions (such as discussed above) of the full contact region of the finger contact 1025 may be used for such overlap calculations.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. The scope of the present invention should, therefore, be determined by the following claims.

What is claimed is:

1. An electronic device, comprising:
    an electronic display configured to display content;
    a touch screen digitizer having a touch surface aligned with the electronic display, the digitizer configured to detect a contact by a touch implement with the touch surface, wherein a detected contact location is based on a contact of a tip of the touch implement with the touch surface, such that the detected contact location is independent of an angle of inclination of the touch implement relative to the touch surface;
    a touch implement inclination detection system configured to determine the angle of inclination of the touch implement relative to a normal of a plane of the electronic display;
    a user location determination system configured to determine location information of an operator relative to the electronic display, including a line of sight between a head of the operator and the electronic display that intersects a transition point of the touch implement between a tip of the touch implement and a shaft of the touch implement; and
    a non-transitory computer readable storage medium storing instructions that, when executed by a processor, are configured to cause the processor to:
        calculate a visual parallax value based on the location information of the operator relative to the electronic, the angle of inclination of the touch implement, and a location on the touch surface intersected by the determined line of sight; and
        map the detected contact location by the touch implement with the touch surface to a location on the aligned electronic display using the calculated parallax value.

2. The device of claim 1, wherein touch surface of the touch screen digitizer is planar, wherein the electronic display is planar, and wherein the planar touch surface is parallel to the planar electronic display.

3. The device of claim 1, wherein the instructions, when executed by a processor, are configured to cause the processor to map the detected contact location to a location on the aligned electronic display by first mapping the detected contact location to a perceived contact location on the touch surface and then mapping the mapped contact location on the touch surface perpendicularly to the aligned electronic display.

4. The device of claim 1, wherein the instructions, when executed by a processor, are further configured to:
    map a plurality of detected contact locations by the touch implement with the touch surface to a plurality of locations on the aligned electronic display using the calculated parallax value.

5. The device of claim 4, wherein the instructions, when executed by a processor, are further configured to:
    generate an object within the displayed content for display on the electronic display corresponding to the plurality of mapped locations.

6. The device of claim 5, wherein the object comprises a signature.

7. The device of claim 1, wherein the user location determination system comprises a location sensor configured to detect location information of a head of the operator.

8. The device of claim 7, wherein the instructions are further configured to cause the processor to:
    determine a line of sight between the head of the operator and the electronic display that intersects a portion of the touch implement different than a contact point of a tip of the touch implement;
    calculate the parallax value further based on a location on the touch surface intersected by the determined line of sight in addition to the location information of the operator relative to the electronic display and the angle of inclination of the touch implement.

9. The device of claim 8, wherein the portion of the touch implement different than a contact point of a tip of the touch implement comprises a portion near a rounded tip of a touch implement.

10. The device of claim 3, wherein the instructions are configured to cause the processor to calculate a parallax value by calculating a distance offset between a detected contact location of the touch implement with the touch surface and a perceived contact location.

11. A method, comprising:
  displaying content via an electronic display;
  detecting a contact by a touch implement with a touch surface of a touch screen digitizer, wherein the touch surface is aligned with the electronic display, wherein the detected contact location is based on a contact of a tip of the touch implement with the touch surface, such that the detected contact location is independent of an angle of inclination of the touch implement relative to the touch surface;
  determining the angle of inclination of a touch implement relative to a normal of a plane of the electronic display via a touch implement inclination detection system;
  determining location information of an operator relative to the electronic display via a user location determination system, including a line of sight between a head of the operator and the electronic display that intersects a transition point of the touch implement between a tip of the touch implement and a shaft of the touch implement;
  calculating a visual parallax value based on the location information of the operator relative to the electronic, the angle of inclination of the touch implement, and a location on the touch surface intersected by the determined line of sight; and
  mapping the detected contact location by the touch implement with the touch surface to a location on the aligned electronic display using the calculated parallax value.

12. The method of claim 11, further comprising:
  deriving a second parallax value for a second location on the electronic display using the location information of the operator, where the second location is different than the detected contact location of the touch implement with the electronic display; and
  offsetting at least a portion of displayed content on the electronic display based on the derived second parallax value.

13. The method of claim 11, further comprising:
  calculating the parallax value further based on the location of the detected contact location by the touch implement with the touch surface in addition to the location information of the operator relative to the electronic display and the angle of inclination of the touch implement.

14. The method of claim 11, wherein the user location determination system comprises a calibration system configured to determine location information of the operator by:
  receiving a contact location of the touch implement with the touch surface;
  identifying an intended contact location on the electronic display corresponding to the contact location of the touch implement with the touch surface; and
  deriving location information of the operator based on a comparison of the intended contact location on the electronic display and a detected contact location on the touch surface.

15. The method of claim 14, wherein receiving the contact location comprises receiving a selection of an object displayed on the electronic display; and
  wherein identifying an intended contact location on the electronic display comprises selecting a location on the touch surface corresponding to the location of the displayed object.

16. The method of claim 11, wherein the angle of inclination of the touch implement relative to the normal of the plane of the electronic display comprises an angle of inclination comprising both horizontal directional components and vertical directional components.

* * * * *